(12) United States Patent
Friedrich et al.

(10) Patent No.: US 11,936,013 B2
(45) Date of Patent: Mar. 19, 2024

(54) CELL CONTACTING ARRANGEMENT FOR AN ENERGY STORAGE MODULE

(71) Applicant: Bayerische Motoren Werke Aktiengesellschaft, Munich (DE)

(72) Inventors: Kilian Friedrich, Munich (DE); Andreas Rozankovic, Shenyang (CN)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/975,841

(22) PCT Filed: May 6, 2019

(86) PCT No.: PCT/EP2019/061546
§ 371 (c)(1),
(2) Date: Aug. 26, 2020

(87) PCT Pub. No.: WO2019/228762
PCT Pub. Date: Dec. 5, 2019

(65) Prior Publication Data
US 2020/0411919 A1    Dec. 31, 2020

(30) Foreign Application Priority Data

May 28, 2018 (DE) ...................... 10 2018 208 340.1

(51) Int. Cl.
*H01M 10/00* (2006.01)
*H01M 10/48* (2006.01)
(Continued)

(52) U.S. Cl.
CPC ....... *H01M 10/482* (2013.01); *H01M 10/486* (2013.01); *H01M 50/507* (2021.01); *H01M 50/522* (2021.01)

(58) Field of Classification Search
CPC ............. H01M 10/482; H01M 10/486; H01M 50/502; Y02E 60/10
See application file for complete search history.

(56) References Cited

U.S. PATENT DOCUMENTS 9,768,426 B2 * 9/2017 Laderer ................. H01M 50/24
10,330,536 B2 * 6/2019 Okamoto ............ H01M 50/507
(Continued)

FOREIGN PATENT DOCUMENTS

CN 104115308 A 10/2014
CN 105144433 A 12/2015
(Continued)

OTHER PUBLICATIONS

Machine translation and DE-102014118188-A1 published Jun. 9, 2016 (Year: 2016).*

(Continued)

*Primary Examiner* — Nicholas P D'Aniello
(74) *Attorney, Agent, or Firm* — Crowell & Moring LLP (57) ABSTRACT

A cell contacting arrangement is provided for an energy storage module having at least one energy storage cell, each storage cell having at least two connection terminals. The cell contacting arrangement has a carrier plate which can be arranged on the energy storage module, a cable harness which is carried by the carrier plate and has a plurality of signal lines, and a plurality of cell connectors which are inserted into the carrier plate or integrated into the carrier plate and are designed to connect a connection terminal of the storage cell and a signal line of the cable harness. There is also a connection element which has a first end which can be connected to the signal line and a second end which can be connected to the cell connector. The carrier plate and/or the cell connector has at least one spatial orientation element (Continued)

which defines the spatial orientation between the connection element and the cell connector and/or the carrier plate.

6 Claims, 5 Drawing Sheets

(51) Int. Cl.
*H01M 50/507* (2021.01)
*H01M 50/522* (2021.01)

(56) References Cited

U.S. PATENT DOCUMENTS

| | | | | |
|---|---|---|---|---|
| 2012/0164509 | A1* | 6/2012 | Ogasawara | H01M 50/20 439/212 |
| 2013/0012079 | A1* | 1/2013 | Sakae | H01M 50/571 439/884 |
| 2013/0130081 | A1 | 5/2013 | Diez et al. | |
| 2014/0212726 | A1 | 7/2014 | Geidl | |
| 2014/0342212 | A1 | 11/2014 | Goesmann et al. | |
| 2014/0342620 | A1 | 11/2014 | Goesmann et al. | |
| 2015/0064524 | A1* | 3/2015 | Noh | H01M 50/522 429/90 |
| 2015/0155596 | A1* | 6/2015 | Gardner | H01M 50/581 429/149 |
| 2015/0287970 | A1* | 10/2015 | Shinohara | H01M 50/51 429/211 |
| 2015/0372354 | A1 | 12/2015 | Nakano et al. | |
| 2016/0043448 | A1 | 2/2016 | Fritz | |
| 2016/0141583 | A1* | 5/2016 | Kim | H01M 50/503 429/158 |
| 2016/0197330 | A1* | 7/2016 | Takase | H01M 50/502 429/92 |
| 2017/0133656 | A1 | 5/2017 | Roemer et al. | |
| 2017/0271642 | A1 | 9/2017 | Groshert et al. | |
| 2018/0006288 | A1 | 1/2018 | Nakayama et al. | |
| 2019/0198842 | A1 | 6/2019 | Takada et al. | |

FOREIGN PATENT DOCUMENTS

| | | |
|---|---|---|
| CN | 107004821 A | 8/2017 |
| DE | 10 2010 031 380 A1 | 1/2012 |
| DE | 10 2012 205 909 A1 | 10/2013 |
| DE | 10 2013 201 556 A1 | 7/2014 |
| DE | 10 2014 110 211 A1 | 1/2016 |
| DE | 10 2017 112 125 A1 | 12/2018 |
| JP | 2017-204330 A | 11/2017 |
| WO | WO 2013/075843 A1 | 5/2013 |
| WO | WO-2016012303 A1 * | 1/2016 ........... H01R 25/162 |

OTHER PUBLICATIONS

International Search Report (PCT/ISA/210) issued in PCT Application No. PCT/EP2019/061546 dated Jun. 25, 2019 with English translation (seven pages).
German-language Written Opinion (PCT/ISA/237) issued in PCT Application No. PCT/EP2019/061546 dated Jun. 25, 2019 (five pages).
German-language Office Action issued in German Application No. 10 2018 208 340.1 dated Mar. 8, 2019 (six pages).
Cover page of EP 2 735 039 A1, published on May 28, 2014 (one page).
Chinese-language Office Action issued in Chinese Application No. 201980007450.4 dated Oct. 27, 2022 with English translation (18 pages).
Chinese-language Office Action issued in Chinese Application No. 201980007450.4 dated Mar. 3, 2022 with English translation (17 pages).

* cited by examiner

CELL CONTACTING ARRANGEMENT FOR AN ENERGY STORAGE MODULE

BACKGROUND AND SUMMARY OF THE INVENTION

The present invention relates to a cell contacting arrangement for an energy storage module comprising at least one energy storage cell, wherein each storage cell has at least two connection terminals, and the cell contacting arrangement has a carrier plate which can be arranged on the energy storage module, a cable harness which is carried by the carrier plate and has a plurality of signal lines, and a plurality of cell connectors which are inserted into the carrier plate or are integrated in the carrier plate and are designed to connect a connection terminal of the storage cell and a signal line of the cable harness.

Energy modules consisting of individual battery cells, for example lithium ion cells, are preferably used in electric and/or hybrid vehicles. However, lithium ion cells are not intrinsically safe and the electrical voltage of each individual cell and its temperature must therefore be monitored. This monitoring or electrical connection of the temperature sensor is effected by means of a cable harness which, for simple assembly, is fastened to a carrier plate which is in turn arranged on the energy storage module. Cell connectors which are intended to enable a connection to a connection terminal of the energy storage cell, on the one hand, and to the signal line, on the other hand, are also integrated in the carrier plate or arranged on the carrier plate. Such a cell connecting arrangement is described, for example, in DE 102011087040.

However, the disadvantage of this prior art is that, on the one hand, the connection between the signal line and the cell connector must be manually provided and, on the other hand, measures against corrosion are required in order to connect the signal line made of copper to the cell connectors made of aluminum. For this purpose, corrosion protection is usually applied to the connecting point between the signal line and the cell connector after the copper signal line has been fitted to the cell connector by means of ultrasonic welding. If a corrosion-proof connection between the signal line and the cell connector has been achieved, the carrier plate is usually connected to the connection terminals, with which contact is to be made, by means of fusion welding at the cell connectors. The corrosion protection coating may also require manual intervention of a person, with the result that the production process is expensive and susceptible to faults. However, even if the corrosion protection coating is applied in an automated manner, the production process remains expensive since a large amount of corrosion protection coating must be used, inter alia, in order to compensate for the manufacturing tolerances. In addition, the automated method gives rise to the risk of a large amount of waste since, as a result of the poor positioning tolerance during automated application, only incomplete coverage of the connecting point can often be achieved.

Therefore, the object of the present invention is to provide a simplified connection of the signal line to the cell connector.

A cell contacting arrangement for an energy storage module comprising at least one energy storage cell, which has at least two connection terminals, is described below. The cell contacting arrangement also has a carrier plate which can be arranged on the energy storage module, a cable harness which is carried by the carrier plate and has a plurality of signal lines, and a plurality of cell connectors which are inserted into the carrier plate or are integrated in the carrier plate and are designed to connect a connection terminal of the storage cell and a signal line of the cable harness.

In order to connect the signal line to the cell connector in an optimized manner, a connecting element is also provided and has a first end, which can be connected to the signal line, and a second end, which can be connected to the cell connector, wherein the carrier plate and/or the cell connector also has/have at least one spatial orientation element which determines the spatial orientation between the connecting element and the cell connector and/or the carrier plate. A fast, simple and positionally accurate arrangement between the signal line and the cell connector can be achieved by means of the additional connecting element and the orientation element, with the result that an automated fastening method is possible. This in turn reduces the susceptibility to faults and is cost-effective.

In this case, as shown by a preferred exemplary embodiment, the spatial orientation element may be in the form of a section which protrudes from the cell connector and can be connected to the second end of the connecting element. For example, the second end of the connecting element can be configured in such a manner that it is pushed or plugged onto the protruding section of the cell connector. This allows a very fast and simple spatial orientation between the signal line and the cell connector.

Alternatively or additionally, the spatial orientation element may be a fixing element, for example a snap-in connection or a fixing pin, which is formed on the carrier plate, interacts with the connecting element and fixes the connecting element in a predefined spatial orientation on the carrier plate and/or on the cell connector.

According to a further advantageous exemplary embodiment, the first end of the connecting element is furthermore made of a first material, in particular copper, and the second end of the connecting element is made of a second material, in particular aluminum. The transition between the two materials in the connecting element can be produced in this case using roll cladding, for example, with the result that no additional corrosion protection has to be applied. A corrosion-free transition between the two materials can be provided by the seamless transition between the two materials in the connecting element itself. The second end of the connecting element itself is then preferably welded to the cell connector by means of fusion welding, whereas the connection between the first end and the signal line can be effected by means of crimping, for example. This provides a particularly simple and corrosion-free connection possibility between the signal line and the cell connector.

It goes without saying that, in addition to the above-mentioned welding and/or crimping, other possibilities for the connection between the second end of the connecting element and the cell connector and/or the first end of the connecting element and the signal line are also possible. In this case, suitable connecting processes of a form-fitting and/or force-fitting and/or materially bonded connection can be used.

According to a further exemplary embodiment, the connecting element also has a housing-like accommodating element which is designed to accommodate a temperature sensor. In this case, the connection between the temperature sensor and the housing-like element can also be effected here in a force-fitting or materially bonded manner, in particular.

For example, it is possible for the temperature sensor to be adhesively bonded into the housing-like accommodating element. For this purpose, an opening can also be provided on the housing-like accommodating element, through which a binder, in particular an adhesive, for the material connection between the temperature sensor and the accommodating element is introduced. Alternatively, the housing-like accommodating element can also be dimensioned in such a manner that a temperature sensor can be fixed therein with a frictional bond. In this case, the housing-like accommodating element is arranged on the first end of the connecting element or is formed by the first end of the connecting element.

A frictional connection is advantageous, in particular, since heat can then be introduced into the temperature sensor without an adhesive material in between, as a result of which the temperature measurement becomes more accurate and faster.

A further aspect of the present invention relates to a method for making contact with a connection terminal of an energy storage cell in an energy storage module. In this case, the method preferably comprises the step of preassembling a cell contacting arrangement as described above, wherein the cell contacting arrangement has a carrier plate, a cable harness which is connected to the carrier plate and has a plurality of signal lines, and at least one cell connector which is suitable for making contact with the connection terminals of the energy storage cells and is integrated in the carrier plate or is arranged on the carrier plate.

In a second step, the cell contacting arrangement which has been preassembled in this manner is arranged on the energy storage module, and the cell connectors are then welded to the connection terminals and the connecting elements are welded to the cell connectors.

This makes it possible to achieve a particularly fast method for connecting the individual storage cells since an additional welding operation is dispensed with and no additional corrosion protection has to be applied. This results in lower costs and a shorter process time.

Furthermore, the step of preassembling the carrier plate may have the optional steps of positioning the cell connectors on/at the carrier plate, arranging connecting elements on a cable harness and/or on the carrier plate, and connecting the signal lines of the cable harness to the connecting elements, and/or connecting the cell connectors to the connecting elements which have been fitted to the cable harness.

The embodiments and features described for the proposed apparatus accordingly apply to the proposed method.

Further possible implementations of the invention al so comprise combinations, not explicitly mentioned, of features or embodiments described above or below with respect to the exemplary embodiments. In this case, a person skilled in the art will also add individual aspects as improvements or additions to the respective basic form of the invention.

Further advantages and advantageous embodiments are indicated in the description, the drawings and the claims. In this case, the combinations of features indicated in the description and in the drawings, in particular, are purely exemplary, with the result that the features may also be present individually or in other combinations.

The invention shall be described in more detail below on the basis of exemplary embodiments illustrated in the drawings. In this case, the exemplary embodiments and the combinations shown in the exemplary embodiments are purely exemplary and are not intended to define the scope of protection of the invention. The latter is defined solely by the appended claims.

BRIEF DESCRIPTION OF THE DRAWINGS

Identical elements or elements which act in a functionally identical manner are denoted using the same reference signs below.

DETAILED DESCRIPTION OF THE DRAWINGS

Figure 1:
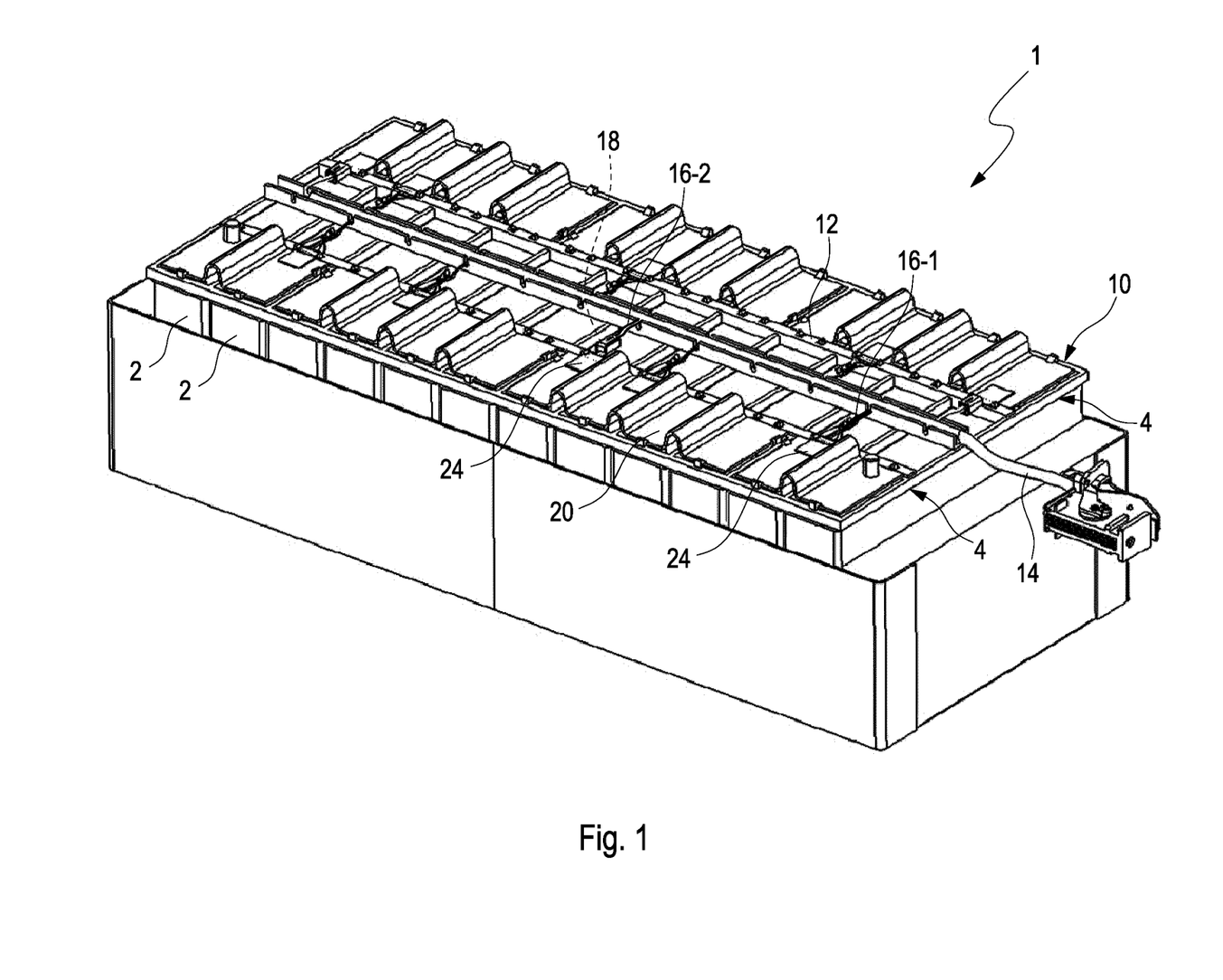
FIG. 1 is a schematic perspective view of an energy storage module with a cell contacting arrangement arranged thereon according to a first exemplary embodiment.

FIG. 1 shows an energy storage module 1 having a plurality of energy storage cells 2 each with two connection terminals 4 (shown in more detail in FIGS. 2 to 5). FIG. 1 also shows that a cell contacting arrangement 10 is arranged on the energy storage module 1 and has a carrier plate 12, a cable harness 14 which is carried by the carrier plate 12 and has a plurality of signal lines 16, and a plurality of cell connectors 20 which are inserted into the carrier plate 12 or are integrated in the carrier plate 12. The cell connectors 20 are designed to connect the connection terminal 4 of each storage cell 2 and the signal line 16 of the cable harness 14 to one another. The signal lines 16 are designed to monitor the voltage of each energy cell 2 and to create, at particular locations, a connection to a temperature sensor 18 which measures the temperature of the storage cell. In FIG. 1, the signal line 16-1 is therefore responsible for voltage monitoring, whereas the signal line 16-2 transmits temperature values.

The different connection possibilities are explained in more detail below with respect to the voltage monitoring, in particular in FIGS. 2a and 2b, and with respect to the temperature sensor, in FIGS. 3a and 3b. FIGS. 4a to 4c show a further connection possibility which is possible both for the signal line and for the temperature sensor.

FIG. 2a shows a spatial side view of a detail of the energy storage module 1 from FIG. 1 and FIG. 2b shows a spatial plan view of a detail of the energy storage module 1.

Figure 2:
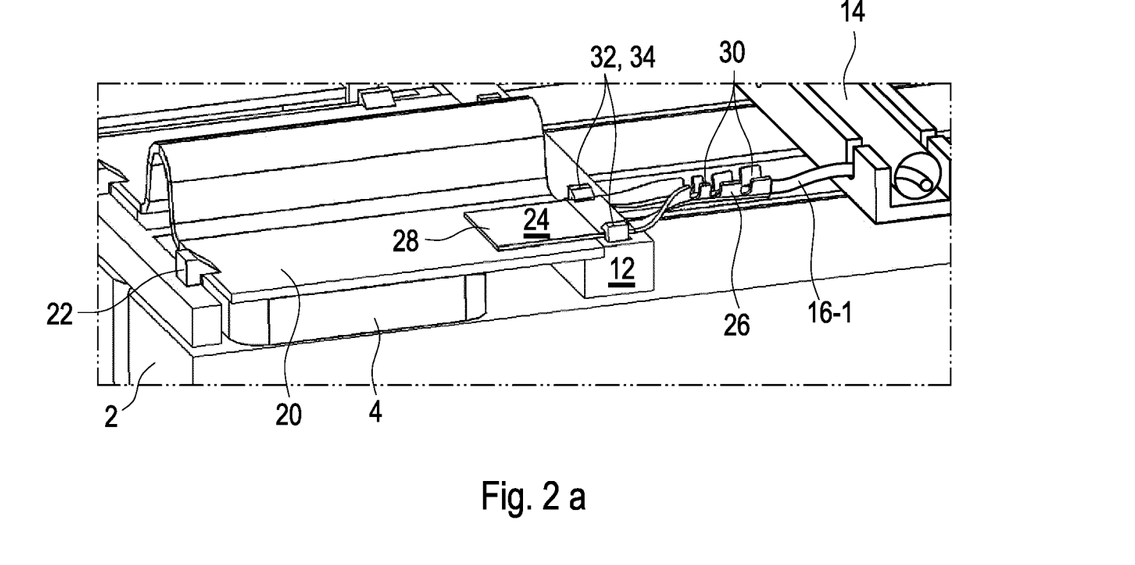
FIGS. 2a, 2b are schematic perspective views of details of the energy storage module illustrated in FIG. 1.

In both FIGS. 2a and 2b, voltage monitoring of the energy cell 2 is enabled by means of a signal line 16-1. As can be gathered from FIGS. 2a and 2b, a cell connector 20 is arranged on the connection terminal 4 of the energy storage cell 2 on the carrier plate 12 and, in the exemplary embodiment illustrated, is fastened by means of hook elements 22 which are integrally formed with the carrier plate 12. As can be gathered from FIG. 2a, the cell connector 20 makes contact with the connection terminal 4 of the energy storage cell 2. It can also be gathered from FIGS. 2a and 2b that, for the connection between the signal line 16-1 and the cell connector 20, a connecting element 24 is also arranged and has a first end 26 and a second end 28, wherein the first end 26 is designed for a connection to the signal line 16-1, whereas the second end 28 is designed for a connection to the cell connector 20. In the exemplary embodiment illustrated in FIG. 2, the first end 26 is equipped with crimping elements 30 which make it possible to crimp the connecting element 24 to the signal line 16-1.

The second end 28 of the connecting element 24 is usually connected to the cell connector 20 in a materially bonded manner, for example by means of welding. In order to avoid having to carry out this welding manually when assembling the carrier plate 12, but rather to make it possible to allow the welding process to take place in an automated manner, a fixed spatial orientation of the connecting element 24 on the carrier plate 12 is necessary. For this purpose, orientation elements 32 are also formed on the carrier plate 12 and, in the exemplary embodiment illustrated, are in the form of latching or snap-in hooks 34 which enable a spatial fixed orientation of the connecting element 24 on the carrier plate 12 and on the cell connector 20. The orientation elements 32 make it possible to achieve a spatial arrangement of the connecting element 24, with the result that the second end 28 of the connecting element 24 can be welded to the cell connector 20 in an automated process.

Figure 3:
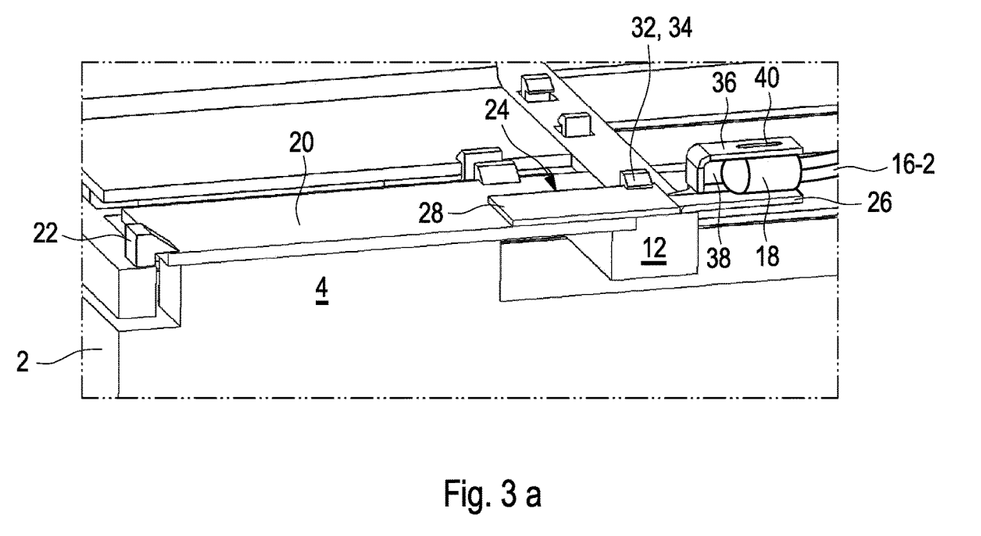
FIGS. 3a, 3b are schematic perspective views of other details of the energy storage module illustrated in FIG. 1.
Figure 4:
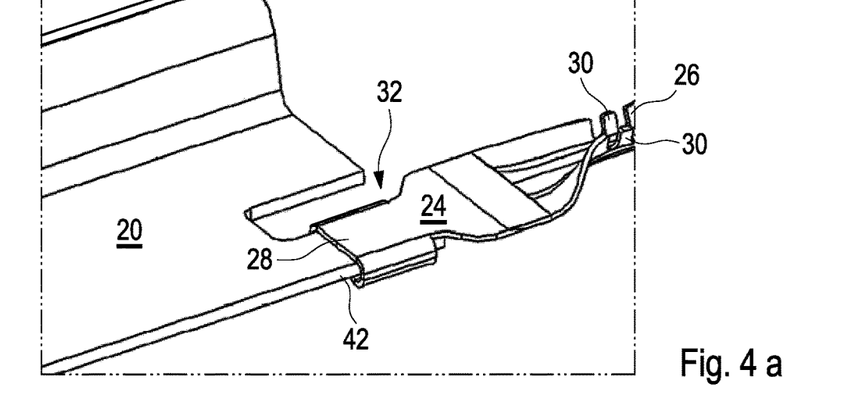
FIGS. 4a-4c are schematic perspective views of an alternative fastening possibility.

In the same manner, a temperature sensor 18 can also be fitted to the cell connector 20, as can be gathered from FIGS. 3a and 3b, in particular. In this case too, the spatial position of the connecting element 24 on the cell connector 20 is again determined via the orientation elements 32 which are in the form of latching lugs 34. Whereas the second end 28 is designed for connection to the cell connector 20, in a similar manner to the exemplary embodiment described in FIG. 3, the connecting element 24 which is suitable for the connection to a temperature sensor 18 also has, at the first end 26, a housing-like accommodating element 36, in the interior 38 of which the temperature sensor 18 is accommodated. In this case, the secure connection of the temperature sensor 18 in the interior of the housing-like accommodating element 36 can be provided, for example, via narrow tolerances and the frictional bond thus formed between the housing-like accommodating element 36 and the temperature sensor 18, but it is also possible to adhesively bond the temperature sensor 18 into the housing-like accommodating element 36. For this purpose, as shown by the exemplary embodiment in FIG. 3b in particular, an elongated hole 40 can be provided in the housing-like accommodating element 36, through which elongated hole a binder, in particular an adhesive, can be introduced into the interior 38 of the housing. Since the spatial orientation of the connecting element 24 is also determined in this case via the orientation elements 32, the connection process between the connecting element 24 and the cell connector 20 can also be carried out here in an automated method.

Instead of providing latching lugs 34 as orientation elements 32 on the carrier plate 12, the spatial orientation can also be achieved, as illustrated in FIGS. 4a to 4c, by plugging the connecting element 24 onto the cell connector 20. In this case, FIG. 4a shows a spatial plan view, FIG. 4b shows a spatial view from below, and FIG. 4c shows a spatial side view of the cell connector 20 with a connecting element 24 fitted thereto. As shown, the cell connector 20 has protruding sections 42 which can be connected to the second end 28 of the connecting element 24. For this purpose, the second end 28 of the connecting element 24, in particular, is bent around to form spring tabs 44, 46 which, as can be gathered from FIGS. 4b and 4c in particular, surround the protrusion 42 of the cell connector in a resilient manner. This likewise makes it possible to spatially prefix the connecting element 24 to the cell connector 20 in order to permanently fasten the connecting element 24 to the cell connector 20 in a subsequent, for example material, connecting step.

As is also schematically shown in FIGS. 4a and 2b in particular, the connecting element 24 is in the form of hybrid sheet metal, wherein the material of the first end 26 is adapted to the material of the signal line 16, that is to say is formed from copper in particular, whereas the material of the second end 28 is adapted to the material of the cell connector 20, that is to say is produced from aluminum or an aluminium alloy in particular. Such hybrid sheet metals are usually produced using roll cladding and provide a gap-free transition between the materials, in this case copper and aluminum. As a result, corrosion protection is directly introduced via the connecting element 24, with the result that it is possible to dispense with an additional corrosion protection coating which prevents the penetration of liquid or moisture into the connecting point between the copper signal line 16 and the aluminum cell connector 20.

Figure 5:
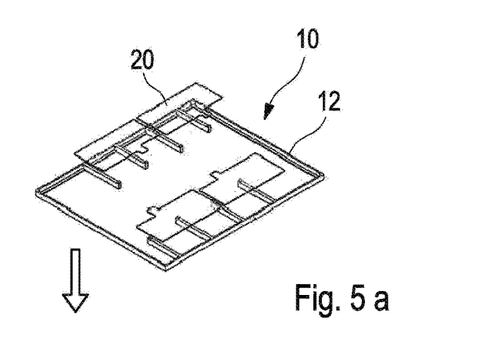
FIGS. 5a-5g illustrate a schematic illustration of a production process for the energy storage module shown in FIG. 1.

FIG. 5, with partial FIGS. 5a to 5g, schematically illustrates the production method for connecting an energy storage module to a cable harness.

In this case, the cell contacting arrangement 10 is assembled in a first step (see FIGS. 5a-5d) before the assembled cell contacting arrangement 10 is fastened to the energy storage module 1 (see FIGS. 5e-5g). In this case, the assembly of the cell contacting arrangement 10 comprises the first step of arranging cell connectors 20 on the carrier plate 12 (FIGS. 5a, 5b). The cable harness 14 is then crimped to the first ends 26 of the connecting units 24 at the ends of the signal lines 16 (FIG. 5c). The cable harness 14 preassembled in this manner is then spatially arranged on the cell connectors 20, by plugging the connecting elements 24 onto protrusions 42 on the cell connector 20 in the exemplary embodiment illustrated here (FIG. 5d).

The cell contacting arrangement 10 preassembled in this manner is then placed onto an energy storage module 1 (FIG. 5e), and the connections between the cell connector 20 and the connection terminal 4 are then provided in an automated method by welding by means of a welding apparatus 50 (FIG. 5f), and the spatial fixing of the connecting elements 24 to the cell connectors 20 is provided by welding by means of a welding apparatus 50 (FIG. 5g). In this case, the same welding method can be used, in particular.

Since the spatial position of the connecting elements 24 on the cell connectors 20 is unambiguously determined by the orientation elements 32, an automated process can also be used for the connection between the cell connector 20 and the connecting element 24.

As a result, the additional welding or assembly operation required in the prior art for the signal line 16 and the cell connector 20, which also usually had to be carried out manually, can be dispensed with. It is likewise no longer necessary to apply corrosion protection to the welding point since integrated corrosion protection is provided by the use of hybrid sheet metal for the configuration of the connecting element 24. A cost-effective cell contacting arrangement 10 which can be assembled in a simple manner can therefore be provided overall.

REFERENCE SIGNS

1 Energy storage module
2 Energy storage cell
4 Connection terminal
10 Cell contacting arrangement
12 Carrier plate
14 Cable harness
16 Signal line
18 Temperature sensor
20 Cell connector
22 Fastening element
24 Connecting element
26 First end of the connecting element
28 Second end of the connecting element
30 Crimping element
32 Orientation element
34 Latching hook 36 Housing-like accommodating element
38 Interior
40 Elongated hole
42 Protrusion
44, 46 Spring lugs
50 Welding apparatus

What is claimed is:

1. A cell contacting arrangement for an energy storage module comprising at least one energy storage cell, wherein each storage cell has at least two connection terminals, comprising:
   a carrier plate which is arrangeable on the energy storage module;
   a cable harness which is carried by the carrier plate and has a plurality of signal lines;
   a plurality of cell connectors which are inserted into the carrier plate or are integrated in the carrier plate and are configured to connect a connection terminal of the storage cell and a signal line of the cable harness; and
   a connecting element having a first end, which is connectable to the signal line, and a second end, which is connectable to the cell connector, wherein
   the cell connector comprises a spatial orientation element which determines the spatial orientation between the connecting element and the cell connector,
   the spatial orientation element is in a form of a section of the cell connector which protrudes from a body of the cell connector and is surrounded by the second end of the connecting element,
   the connecting element has a housing-shaped accommodating element in which a temperature sensor is accommodated,
   the housing-shaped accommodating element is arranged on the first end of the connecting element or is formed by the first end of the connecting element,
   the connecting element is formed as a hybrid sheet metal having no additional corrosion protection elements,
   the first end of the connecting element is composed of a first material,
   the second end of the connecting element is composed of a second material, and
   the first material is different from the second material.

2. The cell contacting arrangement according to claim 1, wherein
   the first material is copper and the second material is aluminum.

3. The cell contacting arrangement according to claim 1, wherein
   the connection between the connecting element and the cell connector and/or the signal line is form-fitting, force-fitting and/or materially bonded.

4. A method for making contact with one or more energy storage cells of an energy storage module using a respective signal line of a cable harness, the method comprising the steps of:
   preassembling the cell contacting arrangement according to claim 1;
   arranging the preassembled cell contacting arrangement on the energy storage module; and
   welding the cell connectors of the cell contacting arrangement to the connection terminals of the energy storage cell and welding the connecting elements to the cell connectors.

5. The method according to claim 4, wherein the step of preassembling the cell contacting arrangement comprises the steps of:
   fixing the first end of the connecting element to a signal line of the cable harness; and
   spatially prefixing the connecting elements to the cell connectors by way of the orientation elements by plugging on or snapping in.

6. The method according to claim 4, wherein the step of preassembling the cell contacting arrangement comprises the steps of:
   spatially prefixing the connecting element with the housing-shaped accommodating element to the cell connectors by way of the orientation elements by plugging on or snapping in; and
   introducing the temperature sensor into the housing-shaped accommodating element of the connecting element and fastening the temperature sensor by way of a frictional bond or a material bond.

\* \* \* \* \*